H. T. BELLAMY.
MANUFACTURE OF COMPOSITION CORES.
APPLICATION FILED SEPT. 29, 1919.
1,384,587.
Patented July 12, 1921.
2 SHEETS—SHEET 1.
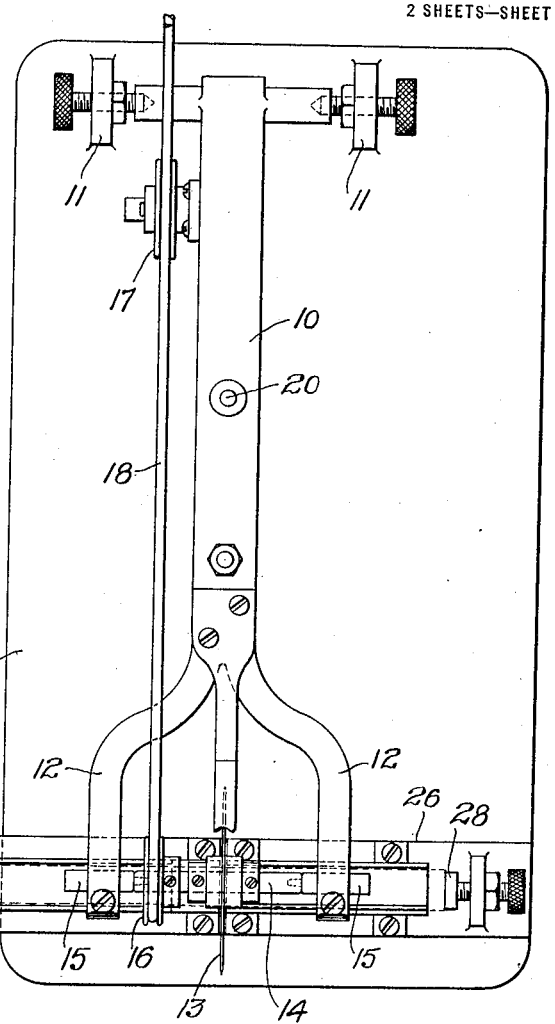
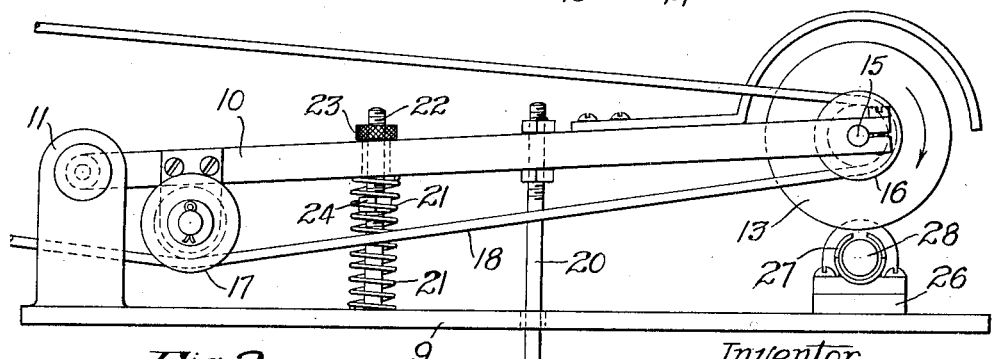
Inventor
Harry Tristram Bellamy
by J. E. Roberts
Atty H. T. BELLAMY.
MANUFACTURE OF COMPOSITION CORES.
APPLICATION FILED SEPT. 29, 1919.

1,384,587.

Patented July 12, 1921.
2 SHEETS—SHEET 2.

Inventor
Harry Tristram Bellamy
by V. E. Roberts
Atty.

UNITED STATES PATENT OFFICE.

HARRY TRISTRAM BELLAMY, OF OAK PARK, ILLINOIS, ASSIGNOR TO WESTERN ELECTRIC COMPANY, INCORPORATED, OF NEW YORK, N. Y., A CORPORATION OF NEW YORK.

MANUFACTURE OF COMPOSITION CORES.

1,384,587.  Specification of Letters Patent.  Patented July 12, 1921.

Application filed September 29, 1919. Serial No. 327,103.

*To all whom it may concern:*

Be it known that I, HARRY TRISTRAM BELLAMY, a citizen of the United States, residing at Oak Park, in the county of Cook and State of Illinois, have invented certain new and useful Improvements in the Manufacture of Composition Cores, of which the following is a full, clear, concise, and exact description.

This invention relates to the manufacture of cores for electrical windings adapted to carry considerable current, and more particularly to the manufacture of composition cores for this purpose.

The object of this invention is to improve the method of manufacturing such cores whereby a product of uniform dimensions and characteristics may be economically produced.

In the practice of this invention the composition is first formed into a tubular form of approximately the diameter desired and of a length which can be conveniently handled and while still in a plastic or semi-plastic state is cut into approximate lengths, turned to exact size and formed with the spiral groove around its periphery, and then cut to its final length. After being finished the core is fired to give it the desired degree of hardness.

In the drawings illustrating this invention:

Figure 1 is a plan view of a mechanism for cutting a tube of composition while still in a semi-plastic form into lengths of approximately the length of a finished core;

Fig. 2 is an end view thereof;

Fig. 3 is a detail plan view partly in section of a portion of a guide for the tube of composition and a cutter for cutting the tube into lengths;

Figure 4:
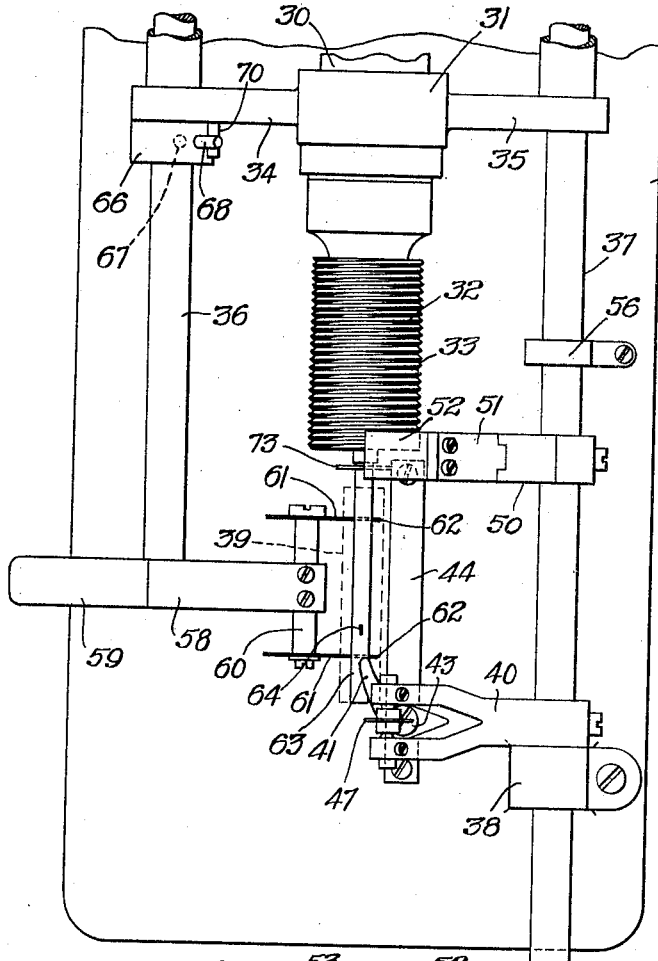
Fig. 4 is a plan view of a mechanism used for turning to exact size, grooving and cutting to final length the core while still in a semi-plastic form, part of the base and the driving mechanism being omitted.
Figure 6:
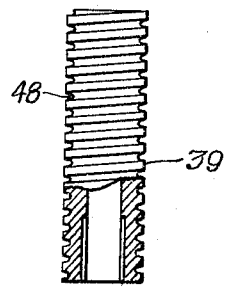
Fig. 6 is an enlarged longitudinal view partly in section of a finished core.

As shown in Figs. 1, 2, and 3, the mechanism for cutting the tube of composition into lengths of approximately the length of a finished core may comprise a supporting base 9 which has pivotally mounted at one end thereof a forked shaped arm 10 which is mounted on suitable bearings 11. The forked shaped arm 10 carries at its opposite end and between the forks 12 thereof a revoluble disk shaped cutter 13 which is suitably secured to a pin 14 revolubly mounted between the forks 12 in suitable bearings 15. A pulley wheel 16 is secured on the pin 14 to one side of the cutter 13 and between the forks 12. Mounted from the forked shaped arm 10 and near and below its pivot point is a guide wheel 17. A driving belt 18 which may receive its motion from any suitable source of power drives the pulley wheel 16 and is guided therefrom on its return by the guide wheel 17.

A rod 20 is secured to the arm 10 for operating it in a downward direction to bring the rapidly revolving cutter into contact with the tube of composition to be cut. Movement in a downward direction may be given to the rod 20 by a foot treadle or by any suitable operating means.

A compression spring 21 is mounted around a pin 22 secured to the base 9 and between the bottom of the arm 10 and the top of the base 9 for returning the arm 10 to its normal position after a movement downward. Adjusting nuts 23 and 24 are screw threaded on the rod 20 above and below the arm 10 for regulating the upward and downward movement of the arm 10.

Below the cutter 13 and mounted on a plate 26 is a support guide 27 of semi-circular cross section upon which the tube of composition is supported while being cut into lengths. The guide 27 as shown in Fig. 1 has been shortened but in practice it is of sufficient length to support any length of tube which can be efficiently handled while in a semi-plastic form. The guide 27 is made of two sections which are separated directly below the cutter 13 a distance slightly in excess of the thickness of the cutter. An adjustable stop 28 is suitably mounted on the plate 26 and in line with the end of the guide 27 for the purpose of varying the lengths to be cut from the tube.

The method of cutting the tube with the above described mechanism is as follows:

A tube 29 formed or molded in any suitable manner and while still in a semi-plastic form is laid in the guide 27. After adjusting the stop 28 to cut off a certain length, the tube is slid on the guide 27 and into contact with the stop 28. The mechanism for revolving the cutter 13 is set in motion and the rod 20 is moved downward, thereby bringing the rapidly revolving cutter 13 down and cutting the tube. The rod is allowed to move upward and the spring 21 returns the arm 10 to its normal position. While the arm 10 is returning to its normal position the operator is removing the cut-off portion of the tube and sliding the remainder of the tube into contact with the stop 28, after which the same operation is repeated as recited above until all of the tube has been cut into lengths.

Figure 5:
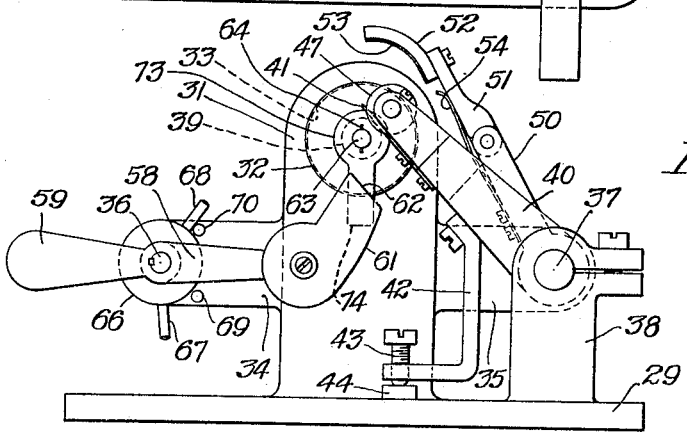
Fig. 5 is a front view thereof.

The mechanism for surfacing the core of composition to its final diameter, rolling a thread or continuous groove upon its peripheral surface and cutting it to final length, may comprise, as shown in Figs. 4 and 5, a supporting base 29 mounting a driving shaft 30 carried by a suitable bearing 31. The shaft 30 can be driven by any suitable driving means preferably a motor (not shown). On a reduced end or arbor of the shaft 30 is removably secured a sleeve 32 with a screw thread 33 cut in its peripheral surface. Secured to the bearing 31 and projecting to each side and below the axis of the shaft 30 are arms 34 and 35 which act as supports or bearings for shafts 36 and 37. The shaft 37 is supported at one end by the arm 35 and at its other end by a bearing 38 and is slidable therein. Secured to the shaft 37 near its forward end is a forked shaped arm 40 which projects upward and toward the shaft 30. Secured to the under side of the arm 40 and on its upward end is a knife 41 for shaving a core 39 to its final diameter. Mounted below the knife 41 on the under side of the arm 40 is a bracket 42 for supporting the arm 40 and keeping the shaft 37 from turning. The bracket 42 has secured in its lower end an adjusting screw 43 which rides on a rail 44. Suitably carried between the forks of the arm 40 is a thread rolling disk 47 which contacts with the semi-plastic core 39 to roll a thread or continuous groove 48 in it directly after the knife 41 has shaved it to its final diameter.

Mounted on the shaft 37 between the bearings 35 and 38 is an upwardly projecting arm 50 which has hinged at its upper end a short arm 51. The arm 51 has secured to its upper end a segment 52 provided with a broken thread 53 on its inside surface which meshes with the thread 33 on the sleeve 32 when the arm 51 is turned down about its pivot and constitutes the feeding mechanism for the rolling disk 47 and surfacing knife 41. A leaf spring 54 returns the arm 51 to its upper or normal position when it is released by the operator. A stop 56 is adjustably secured and positioned on the shaft 37 to come into contact with the bearing 35 when the core has been completely threaded or grooved. The bearing 38 acts as a stop for the arm 40 when in its normal position.

Keyed to the shaft 36 is an arm 58 equipped with a handle 59 at one end and a pin 60 at its other end. The pin 60 is secured in an opening in the arm 58 with its ends spaced equally from the center thereof. Secured on each end of the pin 60 is a knife blade 61 with cutting edges 62 which are so shaped that when the arm 58 is turned upward by depression of the handle 59 they will come into contact with the semi-plastic and revolving core 39 and cut it to its final length with the cutting edges coming into contact with a greatly reduced end or arbor 63 of the shaft 31. The distance between the knife blades 61 is the length of the core when finished. The diameter of the arbor 63 of the shaft 31 is the same size as the opening in the core and is equipped with a key 64 passing through it at right angles to its axis which serves to anchor the core to the arbor 63 and cause it to revolve therewith.

Secured on the shaft 36 in front of the arm 34 is a collar 66 equipped with pins 67 and 68 which respectively engage stop pins 69 and 70 secured in the arm 34 when the arm 58 is turned upward to cut the core or is allowed to return to its normal position thereby allowing the arm 58 to move only the necessary distance in either direction.

The method of surfacing and rolling a thread or continuous groove upon the core and then cutting the core to its final length with the above mentioned mechanism is as follows:

The operator after adjusting the arm 40 to shave the core to its final diameter by turning the screw 43 up or down which moves the knife 41 up or down the required distance, will take a core 39 as indicated by the broken lines in Figs. 4 and 5 which has been cut by the first mentioned cutting mechanism and while still in a semi-plastic form and slide it onto the reduced end or arbor 63 of the shaft 31 and into engagement with the key 64. The driving mechanism for the shaft 30 is now set in motion and the short arm 51 which is hinged to the arm 50 is turned downward against the action of the leaf spring 54 thereby bringing the threaded segment 52 into mesh with the thread 33 on the revolving sleeve 32. The engagement of the thread on the revolving sleeve 32 with the broken thread on the segment 52 causes the shaft 37 to slide in the bearings 35 and 38 and thereby move the arm 40 which causes the knife 41 and the thread rolling disk 47 to move along the core 39 with the knife first surfacing it to its final diameter and the disk 47 following and rolling a thread or continuous groove in its peripheral surface. When the stop 56 comes into contact with the arm 35 the handle 59 is moved down, which movement brings the knife blades 61 up and cuts the revolving core 39 to its final length. The shaft 30 is now stopped and the core is slid off the shaft 30 by a disk 73 equipped with a handle 74 which is suitably disposed on the shaft 30 while in its normal position directly in front of the sleeve 32.

What is claimed is:

1. The process of manufacturing composition cores, which consists in forming the compound into tubular form of approximately the dimensions desired, and while in a semi-plastic state turning it to size, rolling threads upon its peripheral surface and subsequently firing it.

2. The process of manufacturing composition cores, which consists in forming the compound into tubular form of approximately the dimensions desired and while in a semi-plastic state turning to final diameter, rolling a thread upon its peripheral surface, cutting to final length and subsequently firing.

In witness whereof I hereunto subscribe my name this 16th day of September, A. D. 1919.

HARRY TRISTRAM BELLAMY.